(12) United States Patent
Rohde et al.

(10) Patent No.: US 6,197,901 B1
(45) Date of Patent: *Mar. 6, 2001

(54) PREPARATION OF HOMO- AND COPOLYMERS OF ALK-1-ENES

(75) Inventors: Wolfgang Rohde, Speyer; Roland Saive, Ludwigshafen; Hans-Helmut Goertz, Freinsheim; Guenther Schweier, Friedelsheim, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/935,664

(22) Filed: Sep. 23, 1997

Related U.S. Application Data

(63) Continuation of application No. 08/592,353, filed as application No. PCT/EP94/02048 on Jun. 23, 1994, now abandoned.

(30) Foreign Application Priority Data

Jul. 10, 1993 (DE) ................................................. 43 23 192

(51) Int. Cl.⁷ ........................................................ C08F 4/08
(52) U.S. Cl. ........................ 526/132; 502/117; 502/128; 502/152; 526/129; 526/160; 526/943; 526/104; 526/348; 526/352
(58) Field of Search .................................. 526/129, 160, 526/132, 943, 104, 348, 352; 502/117, 128, 152

(56) References Cited

U.S. PATENT DOCUMENTS

| | | | |
|---|---|---|---|
| 3,013,002 | * 12/1961 | Breslow et al. . | |
| 3,709,853 | 1/1973 | Karapinka . | |
| 3,806,500 | * 4/1974 | Karol | 526/160 |
| 3,879,368 | 4/1975 | Johnson . | |
| 4,424,139 | * 1/1984 | McDaniel et al. | 526/129 |
| 4,803,253 | * 2/1989 | McDaniel et al. | 526/160 |
| 4,806,638 | 2/1989 | Brand et al. . | |
| 5,169,815 | * 12/1992 | Dawkins | 526/129 |

FOREIGN PATENT DOCUMENTS 36 34 534    4/1988   (DE) .

* cited by examiner

Primary Examiner—David W. Wu
Assistant Examiner—Ling Sui Choi
(74) Attorney, Agent, or Firm—Keil & Weinkauf

(57) ABSTRACT

Polyalk-1-enes are prepared by polymerization of alk-1-enes with the aid of the compound bis(cyclopentadienyl)-chromium(II)

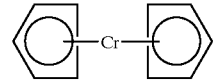

in which the cyclopentadienyl rings may carry inert organic radicals, said compound being adsorbed on an inorganic oxide carrier, by a process in which the polymerization is carried out in the presence of an organometallic compound of a metal of main groups I to III or of a metal hydride, in particular of n-butyl-lithium.

6 Claims, No Drawings

PREPARATION OF HOMO- AND COPOLYMERS OF ALK-1-ENES

This application is a continuation of application Ser. No. 08/592,353, filed on Jan. 11, 1996 now abandoned, which is a 371 of PCT/EP94/02048 filed Jun. 23, 1994.

The present invention relates to an improved process for the preparation of polyalk-1-enes, in particular of polyethylenes and copolymers of ethylene with $C_3$–$C_{10}$-alk-1-enes, by polymerization of alk-1-enes with the aid of the compound bis(cyclopentadienyl)-chromium(II)

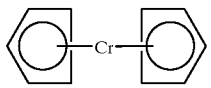

in which the cyclopentadienyl rings may carry inert organic radicals, said compound being adsorbed on an inorganic oxide carrier.

The present invention furthermore relates to precipitation polymers which are obtainable by this process.

The preparation of polyethylene and copolymers of ethylene with $C_3$–$C_{10}$-alk-1-enes by polymerization of ethylene or mixtures of ethylene and $C_3$–$C_{10}$-alk-1-enes with the aid of supported catalysts comprising an inorganic oxide carrier, in particular silica, and bis(cyclopentadienyl)-chromium(II), which is generally referred to as chromocene, is disclosed in U.S. Pat. No. 3,709,853.

Furthermore, U.S. Pat. No. 3,879,368 discloses catalysts of this type which have been pretreated with silanes or alkylsilanes.

Moreover, DE-A 36 34 534 recommends the polymerization of ethylene and of ethylene with other alk-1-enes by means of a silica/chromium trioxide supported catalyst and an alkyllithium.

However, the catalysts used in this process have the disadvantage that they lead to polymers having a broad molecular weight distribution (DE-A 3 634 534) or that their productivity is relatively low (U.S. Pat. No. 3,709,853), making them of only limited use for largescale industrial processes. Accordingly, we have found an improved process for the preparation of polyalk-1-enes by polymerization of alk-1-enes with the aid of the compound bis(cyclopentadienyl)-chromium(II)

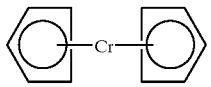

in which the cyclopentadienyl rings may carry inert organic radicals, said compound being adsorbed on an inorganic, oxide carrier, wherein the polymerization is carried out in the presence of an organometallic compound of a metal of main groups I to III or of a hydride of these metals.

A suitable active component of the polymerization catalyst is primarily bis (cyclopentadienyl)-chromium(II), as well as its derivatives in which the cyclopentadienyl groups carry $C_1$–$C_6$-alkyl and/or $C_6$–$C_{15}$-aryl as substituents. Fused cyclopentadienyl groups, such as indene and fluorene, which likewise may be substituted by the stated radicals, are also suitable.

Suitable carriers are metal oxides, such as the oxides of Si, Al or Zr, silica or mixed oxides of aluminum and silicon being preferred. The preparation of such carriers is described in, for example, DE-A 36 34 534. These carriers should preferably have a high internal surface area of from about 50 to 1,000 $m^2/g$, so that the adsorbed chromocene has a very large area of contact with the olefin. The mean pore diameter is from 1 to 100 nm. A particularly preferred commercial product is, for example, Silica Gel 332 from Grace.

Before being loaded with the chromocene, the carriers must be activated in order to remove adsorbed water. For this purpose, they are heated in an inert gas atmosphere for from about 1 to 30 hours at from 200 to 900° C.

A plurality of methods have been described for loading the carrier.

For example, the dried carrier may be loaded by sublimation. For this purpose, the chromocene and carrier are mixed in an inert atmosphere and the pressure is then reduced to such an extent that the chromocene vaporizes and is adsorbed on the carrier.

The supported catalyst can also be prepared by first dissolving the chromocene in a solvent and allowing the solution to act on the carrier for several hours. Suitable solvents are hydrocarbons, such as pentane, n-hexane, cyclohexane, benzene and xylene. The amount of solvent should be such that the carrier is completely wet. If a product in powder form is desired, the solvents are removed from the suspension.

The amount of chromium in the supported catalyst is, as a rule, from 0.1 to 10% by weight, based on the carrier.

Polymers which can be prepared by the novel process are in particular polyethylene and copolymers of ethylene with $C_3$–$C_{10}$-alk-1-enes, preferably $C_3$–$C_6$-alk-1-enes. The process is also suitable for the copolymerization of the other alk-1-enes conforming to the definition.

The amount of alk-1-ene is from 100 to 10,000, preferably from 1,000 to 200,000 g/g, based on the amount of supported catalyst used.

A typical feature of the novel process is that a metal hydride or an organometallic compound is used in addition to the chromocene supported catalysts in the polymerization of the alk-1-enes, the metal of the organometallic compound belonging to main groups I to III.

The organometallic compounds and metal hydrides contain metals of main groups I to III. In addition to lithium, suitable metals are sodium, potassium, beryllium, magnesium, calcium, barium, boron and aluminum.

In the case of the organometallic compounds, the metal alkyls and metal aryls are preferred. Suitable hydrocarbon radicals are aliphatic radicals of 1 to 6 carbon atoms and aromatic radicals of 6 to 15 carbon atoms. The lithium compounds, eg. n-butyllithium, sec-butyllithium and phenyllithium, are particularly preferred here.

Examples of suitable metal hydrides are sodium hydride and calcium hydride, mixed hydrides, such as lithium aluminum hydride and sodium borohydride, and the boron hydrides.

The ratio of the metal organyl or metal hydride to be used according to the invention to the chromocene catalyst is preferably from 0.1 to 100, particularly preferably from 1 to 20, equivalents of the metal per mol of chromium. It is advantageous if the ratio is maintained during the entire polymerization process by corresponding addition of the metal organyl or metal hydride.

The process can be carried out in a conventional manner, as described, for example, in Ullmanns Encyklopädie der technischen Chemie, Volume 19, 4th Edition.

The precipitation polymerization in a solvent in which the monomers are soluble but not the polymer is preferred. Suitable solvents are in particular aliphatic hydrocarbons, especially $C_4$–$C_{10}$-alkanes.

The conventional antistatic agents can be used in order to avoid formation of deposits on the reactor walls. These are, for example, mixtures of chromium alkylsalicylates, calcium salts of a sulfo-containing dioctyl succinate or didecyl succinate and the ionomeric copolymers of ethyleneimine with unsaturated carboxylic acids, as described, for example, in DE-A 23 02 962.

In the precipitation polymerization in the presence of n-butyllithium, the polymer is obtained in the form of fine particles which, after removal of the solvent, unexpectedly have a higher bulk density than precipitation polymers which are obtainable by previously known methods, for example those of U.S. Pat. No. 3,709,853. These polymers have the advantage that they can be used without further granulation for the production of moldings.

The novel process generally has the advantage of particularly high productivity, ie. a smaller amount of catalyst than in the past is required for the preparation of a certain amount of the polymer. This is presumably due to the fact that the novel additives to be used trap H-active or oxidizing impurities and thus protect the sensitive catalyst.

EXAMPLES

A. Preparation of supported catalysts for the continuous polymerization 100 g of the carrier described above were suspended in a solution of 3.5 g of bis(cyclopentadienyl)-chromium(II) in 500 ml of n-heptane. The suspension was stirred for 8 hours and then used directly.

A further supported catalyst, which was loaded with twice the amount of bis(cyclopentadienyl)-chromium(II), was prepared by following the above method but using a solution of 7.0 g of bis(cyclopentadienyl)-chromium(II) in 500 ml of n-heptane.

B. Preparation of a supported catalyst for the batchwise polymerization 15 g of a silica gel (SG 332 from Grace) calcined at 800° C. for 24 hours and having a particle size of from 20 to 45 μm, a specific surface area of 320 m²/g and a pore volume of 1.75 ccm/g were suspended in a solution of 1.04 g of bis(cyclopentadienyl)-chromium(II) in 200 ml of n-heptane. Stirring was carried out for two hours at room temperature, after which the carrier was filtered off, washed with n-heptane and dried at room temperature under reduced pressure to give a free-flowing powder.

Example 1 (according to the invention)

Continuous polymerization

In a 200 loop reactor having a closed circulation, ethylene was polymerized continuously in isobutane as the solvent at 88° C. and 40 bar, an ethylene concentration of 18% by volume being maintained during the entire duration of the experiment. In addition, a constant amount of 15 l/h of hydrogen and 0.14 g/h of an antistatic agent was passed into the reactor. At a constant addition of 2.8 g/h of a chromocene/$SiO_2$ supported catalyst laden with 1% by weight of chromium (corresponding to $0.5 \cdot 10^{-3}$ mol of Cr/h) and 0.1 g/h of n-butyllithium ($1.5 \cdot 10^{-3}$ mol/h) to the reactor, 19 kg/h of polyethylene were obtained, corresponding to a productivity of 6,800 g of polyethylene per g of catalyst. The polyethylene obtained had a bulk density of 440 g/l (determined according to DIN 53,468).

Example 1V/1 (for comparison)

This experiment differs from Example 1 in that the added amount of chromocene/$SiO_2$ supported catalyst, laden with 1% by weight of chromium, was increased to 5.6 g/h (corresponding to $1.1 \cdot 10^{-3}$ mol of Cr/h), but no n-butyllithium was added. 14 kg/h of polyethylene were obtained corresponding to a productivity of 2,500 g of polyethylene per g of catalyst. The polyethylene obtained had a bulk density of 360 g/l (determined according to DIN 53,468).

Example 1V/2 (for comparison)

This experiment differs from Example 1 in that the chromocene/$SiO_2$ supported catalyst was laden with twice the amount of chromium (2% by weight of chromium) and no n-butyllithium was added. 23 kg/h of polyethylene was obtained, corresponding to a productivity of 6,600 g of polyethylene per g of catalyst. The polyethylene obtained had a bulk density of 375 g/l (determined according to DIN 53,468).

Examples 2–5

Batchwise polymerization (according to the invention)

400 ml of dry heptane flushed with argon were initially taken in a 1 l autoclave under argon, and a monomolar solution of butyllithium in heptane was added. Thereafter, hydrogen at 0.2 bar and ethylene at 30 bar were forced in at 70° C. until a total pressure of 30 bar had been reached, after which 100 mg ($3.8 \cdot 10^{-2}$ mmol of Cr) of the chromocene/$SiO_2$ supported catalyst were introduced into the autoclave, the polymerization of the ethylene beginning immediately. At a constant temperature of 70° C., the pressure of 30 bar was maintained for 90 minutes, after which the polymerization was stopped by letting down the autoclave and the heptane was evaporated off from the resulting suspension.

This experiment was modified in Examples 2 to 5 with different hydrogen partial pressures and amounts of butyllithium and with triethylaluminum instead of butyllithium (cf. Table 1).

The results of these experiments are shown in the Table.

|  | Example | | | |
| --- | --- | --- | --- | --- |
|  | 2 | 3 | 4 | 5 |
| Butyllithium [mg] | 40 | 30 | — | — |
| Triethylaluminum [mg] | — | — | 30 | 30 |

-continued

| | Example | | | |
|---|---|---|---|---|
| | 2 | 3 | 4 | 5 |
| $H_2$ pressure [bar] | 0.2 | 0.5 | 0.2 | 0.5 |
| Productivity[1] | 2.5 | 1.2 | 1.5 | 1.2 |
| Bulk density [g/l] | 390 | 360 | 315 | 300 |

[1] kg of polymer per g of catalyst

We claim:

1. A process for the preparation of a polyalk-1-ene, which process consists essentially of polymerizing an alk-1-ene with a polymerization catalyst prepared by a process consisting essentially of contacting essential components (a) bis(cyclopentadienyl)-chromium(II) which has been adsorbed on an inorganic oxide carrier with (b) an organometallic compound which is selected from the group consisting of lithium alkyls and lithium aryls, or a hydride of a metal of main groups I to III of the periodic table of elements, contact of the essential components being made in the presence of the alk-1-ene.

2. The process of claim 1, wherein the bis (cyclopentadienyl)-chromium(II) has cyclopentadienyl rings which carry substituent organic radicals selected from the group consisting of $C_1$–$C_6$-alkyl and $C_6$–$C_{15}$-aryl.

3. A process as claimed in claim 1, wherein the organometallic compound used is a hydrocarbyl-lithium compound having a radical selected from the group consisting of aliphatic radicals of 1 to 6 carbon atoms and aromatic radicals of 6 to 15 carbon atoms.

4. A process as claimed in claim 3, wherein the hydrocarbyl-lithium compound used is n-butyllithium.

5. The process of claim 1, wherein the alk-1-ene is ethylene or a mixture of ethylene with one or more $C_3$–$C_{10}$-alk-1-enes.

6. A process as claimed in claim 1, wherein the polymerization is carried out by the precipitation polymerization method.

* * * * *